United States Patent Office 3,389,186
Patented June 18, 1968

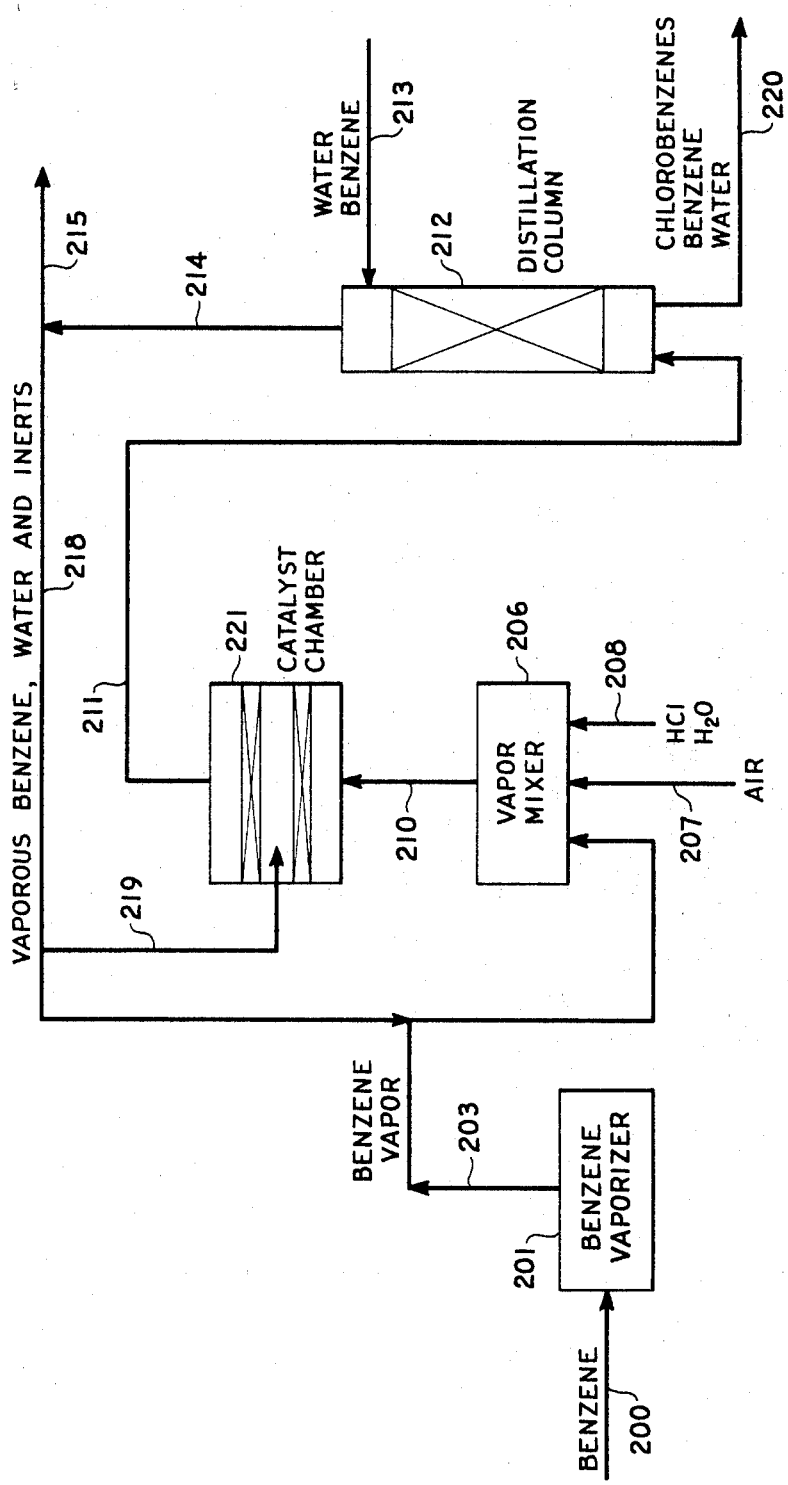

3,389,186
BENZENE OXYCHLORINATION
Walter H. Prahl, Buffalo, N.Y., Jay P. Eggert, Bellefonte, Ashland, Ky., and Sol J. Lederman, Kenmore, Eric H. Scremin, Niagara Falls, and Albert C. Ullrich, Williamsville, Buffalo, N.Y., assignors to Hooker Chemical Corporation, Niagara Falls, N.Y., a corporation of New York
Continuation-in-part of application Ser. No. 133,803, Aug. 25, 1961. This application Nov. 26, 1965, Ser. No. 510,078
4 Claims. (Cl. 260—650)

This is a continuation-in-part of our co-pending applications Ser. No. 133,803, filed Aug. 25, 1961, now abandoned, and Ser. No. 292,460, filed July 2, 1963.

This invention relates to the chlorination of benzene, and more specifically to the vapor phase chlorination of benzene by means of hydrogen chloride and an oxygen-containing gas over a catalyst, at elevated temperatures between about two hundred and about three hundred degrees centigrade.

The vapor phase chlorination of benzene by means of hydrochloric acid and an oxygen-containing gas is carried out essentially for the purpose of producing monochlorobenzene. However, with increasing conversion of benzene to monochlorobenzene, increasing quantities of di- and more highly chlorinated benzenes are formed. For this reason, it is practically necessary to keep the conversions down to around ten to twenty percent per pass, or in other words, to pass through the catalyst an excess of benzene vapor of five to ten times the quantity which is to be reacted. In the conventional method the whole quantity of benzene is first vaporized with a concurrent consumption of steam, then passed through the catalyst together with appropriate quantities of hydrogen chloride, water and air, and then the condensible components of the reaction mixture are condensed with a concurrent consumption of cooling water. The excess benzene is separated, for instance, by distillation, and returned to the vaporization step for re-use.

An object of the present invention is to provide a more economical method of producing monochlorobenzene by saving some of the heat normally required to vaporize the excess benzene and some of the cooling water normally required to condense it.

Another object is to provide a more economical method of producing monochlorobenzene by permitting the production of a given quantity of monochlorobenzene in smaller equipment.

Still another object is to improve the thermal characteristics of the reaction and thereby reduce the tendency of the reaction to lead to complete combustion of some benzene to carbon dioxide.

Other objects of the invention will become apparent in the course of the description.

These and other related objects of the present invention are achieved by introducing the reacted mixture from the catalyst chamber with substantially no cooling into the bottom portion of a distillation zone or column, into the top portion of which benzene and water are fed, thereby utilizing the available heat content of the reacted mixture to evaporate a corresponding quantity of benzene and water in the approximate composition of the benzene-water azeotrope, thereby forming a vaporous mixture comprising water, benzene and inerts at the top of the column, withdrawing the said vaporous mixture, and re-circulating a portion of the said benzene-water mixture to the said catalyst chamber.

The percentage of materials which can be returned as feed to the catalyst chamber in any reaction depends mainly upon the quantity of foreign materials which must be purged from that reaction's product stream. The foreign materials to be removed from the stream of the present reaction are mainly nitrogen when the oxygen-containing gas used is air, water which is introduced with the reactant hydrogen chloride, and small amounts of by-product carbon dioxide. The quantity of these foreign materials to be purged is so large that a direct recirculation of the reactants has up to now been impossible, for the reason that it would interfere with the necessary purging of the large quantities of foreign matter in the system, and thus lead to an unmanageable increase in purge products and an unacceptable dilution of the reactants.

According to the present invention, it was found that if the sensible heat of the reacted mixture issuing from the catalyst chamber is used to vaporize benzene and water in a ratio of approximately the benzene-water azeotropic composition, then the composition of the vaporous mixture issuing from the top of that column is so improved that the recirculation of a substantial portion of it into the reaction can be permitted without incurring the disadvantages above mentioned. We have found that from about five percent to about seventy-five percent of the resultant vaporous mixture can be recirculated to the reaction zone. A more preferable operating range however, is from about ten percent to about forty percent of the resultant vaporous mixture.

The improvement in the vapor mixture to be recycled is believed to be caused by two main factors; but we do not want to be limited to these theories, except as defined in the appended claims: (1) A considerable percentage of the water introduced into the reaction in the form of about twenty percent hydrochloric acid and formed in the reaction by the chlorination, together with the chlorinated benzenes, is eliminated at the bottom of the column. (2) The percentage of purge material in the vaporous mixture issuing from the top of the column is reduced by the addition to it of the benzene-water mixture having approximately the composition of the azeotrope which is vaporized in the column.

The result is that the concentration of the purge gases is sufficiently low to permit recycling of a portion of it into the reaction.

Referring to the figure, the following description is given to facilitate an understanding of the invention.

Benzene (liquid) in line 200 is vaporized in benzene vaporizer 201. The benzene vapors pass through line 203 to vapor mixer 206, where air from line 207 and hydrochloric acid from line 208 are mixed with the benzene. The mixed vapors then pass through line 210 into catalyst chamber 221. The resultant hot reaction gases pass through line 211 with substantially no cooling to distillation column 212, where water and benzene fed in through line 213 are used to condense out the chlorobenzenes. The liquid chlorobenzenes, benzene and water are withdrawn through line 220 for further processing. A portion of the vaporous overhead stream in line 214 is withdrawn through line 215 for further processing.

In accordance with the instant invention, the remaining portion of the vaporous mixture in line 214 is recirculated in line 218 to the catalytic reaction zone. The vaporous material in line 218, can be returned to the beginning of the process and re-introduced at line 203. In addition, the vaporous effluent stream line 218 can be split with one stream being re-injected into the system at line 203, while the remaining stream is re-injected through line 219 directly into the reaction gases emerging from one catalytic zone and passing to the next adjacent zone in catalyst chamber 221.

The advantages of this method will be demonstrated by the comparison of the following two numerical examples, the first of which shows the operation, wherein the sensible heat of the crude reactants is not utilized in accordance with our invention, while the second shows the method according to this invention. However, we do not wish to be limited to them except as defined in the appended claims.

Example 1

Benzene at the rate of 10,343 pounds per hour is vaporized and mixed with the vapors of 3169 pounds per hour of 17.3 percent hydrochloric acid, and then passed together with 1545 pounds per hour of air, at a temperature of about 200 to about 300 degrees centigrade, through a catalyst chamber in a process according to U.S.P. 1,963,761. Table I gives in column 1 the composition in pounds per hour of the gas-vapor mixture entering the reaction chamber, and in column 3 the composition of the reacted gas-vapor mixture coming out of the catalyst chamber having a temperature of approximately 300 degrees centigrade.

The product, namely 1400 pounds per hour of monochlorobenzene and 140 pounds per hour of dichlorobenzenes, can be isolated by the conventional methods such as condensation, distillation, etc. Thus, even if the products could be removed without condensing simultaneously any of the benzene, the percentage of material to be purged (e.g. water, nitrogen, and carbon dioxide), would amount to about 35 percent of the mixture, which is much too large for recycling from a practical standpoint.

TABLE I.—PROCESS OF EXAMPLE I

| | Starting Material Vaporized, lb./hr. | Gas Vapor Chlorinator Product, lb./hr. | Bottoms Product Composition, lb./hr. |
|---|---|---|---|
| Monochlorobenzene | | 1,400 | 1,400 |
| Dichlorobenzene | | 140 | 140 |
| Benzene | 10,343 | 9,274 | |
| HCl | 549 | 16 | |
| Water | 2,620 | 2,896 | |
| $N_2$ | 1,188 | 1,188 | |
| $O_2$ | 357 | 73 | |
| $CO_2$ | | 56 | |
| Others | | 14 | |
| Total | 15,057 | 15,057 | |

Example 2.—Process according to invention

In the process according to this invention, the total vaporized starting material entering the catalyst chamber as given in Table II, column 3, differs from that used in Example 1 only insofar as slightly more water (2948 pounds per hour instead of 2620 pounds per hour), slightly more nitrogen (1316 pounds per hour instead of 1188 pounds per hour), are present. The figures for the other starting materials namely the reactants, benzene, hydrogen chloride and oxygen, are identical with those in Example 1.

Likewise, the composition of the crude product mixture leaving the catalyst chamber corresponds identically with the figures shown in Table II, column 4, and Table I, column 2, except for the slightly larger water, nitrogen and carbon dioxide contents.

This reaction product mixture is fed into a distillation column operated at approximately atmospheric pressure to the top of which are fed the quantities of benzene and water shown in Table II, column 5. The available heat of the crude product vapor mixture entering the bottom of the column is thereby utilized essentially for the vaporization of the benzene-water azeotrope. We have found that the gas-vapor mixture issuing from the top of that column has approximately the composition given in Table II, column 6. Thus, the benzene content of this resultant vaporous mixture has been increased to 87.3 percent benzene in Table II. This enrichment in benzene content in any given case depends on the original composition of the reaction product mixture and its heat content, and it may increase the benzene content to values of from about 60 percent to about 90 percent, depending on these factors.

TABLE II.—PROCESS OF EXAMPLE 2

| | Starting Material Vaporized, Lb./Hr. | Material Recycled, Lb./Hr. | Total Material Into Catalyst Chamber, Lb./Hr. | Crude Product Into Still, Lb./Hr. | Liquid Into Top of Still, Lb./Hr. | Gaseous Material Leaving Still, Lb./Hr. | Liquid Material Leaving Col., Lb./Hr. | End Product, Lb./Hr. |
|---|---|---|---|---|---|---|---|---|
| Monochlorobenzene | | | | 1,400 | | | 1,400 | 1,400 |
| Dichlorobenzene | | | | 140 | | | 140 | 140 |
| Benzene | 6,755 | 3,588 | 10,343 | 9,274 | 19,314 | 26,888 | 1,700 | |
| HCl | 549 | | | 549 | 16 | | 16 | |
| Water | 2,620 | 328 | 2,948 | 3,224 | 1,779 | 2,382 | 2,621 | |
| $N_2$ | 1,140 | 176 | 1,316 | 1,316 | | 1,316 | | |
| $O_2$ | 347 | 10 | 357 | 73 | | 73 | | |
| $CO_2$ | | 9 | 9 | 65 | | 65 | | |
| Others | | | | 14 | | | 14 | |
| Total | 11,411 | 4,111 | 15,522 | 15,522 | 21,093 | 30,724 | 5,891 | |

The material to be purged from the vaporous mixture leaving the top of the still (water, nitrogen and carbon dioxide), amounts to only 13.5 percent in this stream (as compared to about 35 percent in Example 1). A substantial portion of it therefore can be profitably recycled.

It is entirely feasible to supply all the benzene to be used in the reaction by recycling a portion of this stream. However, since normally some benzene vapor is available from the purification of the product, we prefer to supply only about one-half of the required benzene by recycling. In the present example as shown in Table II we recycle only about 13.4 percent of this gas stream, giving a recycle stream of the composition shown in column 3.

In order to reach the desired composition of the stream entering the catalyst chamber as given in column 3 of Table II, we vaporize the quantities shown in column 1, namely 3169 pounds per hour of 17.3 percent hydrogen chloride with 1487 pounds of air added to it, and we vaporize 6755 pounds per hour of benzene.

A comparison of these figures with those in Example 1 shows that we obtain essentially the same composition of the reaction mixture and the same production by vaporizing only 6755 pounds per hour of benzene, as compared to 10,343 pounds per hour of benzene, in the conventional process.

In addition, we have found that owing to the slightly higher dilution with inerts (water 2948 pounds per hour, against 2620 pounds per hour, and nitrogen 1316 pounds per hour against 1188 pounds per hour), the combustion taking place in the catalyst chamber, as indicated by the production of carbon dioxide, would be actually somewhat lower, and the yield of product correspondingly higher in the process according to the present invention than in the conventional process.

Another of the main advantages of our process is the fact that the improved thermal economy of the process permits a lower conversion per pass, without undue increase in operating expense involved in the vaporization of benzene. This in turn results in a lowered simultaneous production of unwanted di- and more highly chlorinated benzenes.

Still another advantage is that smaller size equipment may be used to obtain the same results of the conventional process.

The vaporous mixture of water, benzene and inerts being recirculated to the benzene oxychlorination zone is recirculated to a suitable point in the overall benzene oxychlorination process where it is re-injected into the process. A preferred method of this invention is to pass the vaporous mixture with the stream of benzene, HCl, and air into the catalytic reaction zone, preferably prior to entering the pre-heater. The two streams can be fed separately or together into the pre-heater. This both pre-mixes and pre-heats the materials. Other methods for re-injecting the recirculated vaporous mixture into the process can be used however. For instance, as shown in our said co-pending application Ser. No. 292,460 filed July 2, 1963, by dividing the catalyst into at least two packed catalytic zones in series, each of said zones being adapted to cause only a partial conversion of the reactants to monochlorobenzene and to cause an increase in temperature of the reaction gas stream, and it can be re-injected by introducing at least some of the vaporous mixture directly into the reaction gas stream between the catalytic zones in order to cool the reaction gases while passing from one catalytic zone to the next adjacent zone. Still other methods of re-entering the recirculated vaporous mixture into the benzene oxychlorination system may be used. The portion of vaporous effluent being recirculated can be split into a number of streams with one stream re-injected into the system with the stream of benzene, HCl and oxygen-containing gas, while the remaining stream or streams being re-injected elsewhere, such as directly into the reaction gases emerging from one catalytic zone and passing to the next adjacent zone.

Example 3.—Process with 51.4% recycled

In Example 2, about 13.4 percent of the vaporous effluent from the distillation column is recirculated. (This is calculated from Table II by dividing 3588 in column 3 by 26,888 in column 7 of Table II and multiplying by 100.) The following example is given to further illustrate the invention, by showing in Table III a process wherein about 51.4 percent of the vaporous effluent from the distillation column is recirculated to the beginning of the benzene oxychlorination process and passed with the benzene, HCl and air into the catalytic reaction zone. (This percentage is calculated from Table III by dividing 400,000 in column 3 by 778,215 in column 7 and multiplying by 100.) The figures in Table III are based on material- and heat-balance data from large-scale commercial operation.

TABLE III.—PROCESS OF EXAMPLE 3

|  | Material Vaporized, lb./hr. | Material Recycled, lb./hr. | Total Material Into Catalyst Chamber, lb./hr. | Crude Product Into Still, lb./hr. | Liquid Into Top of Still, lb./hr. | Gaseous Material Leaving Still, lb./hr. | Liquid Material Leaving Col. lb./hr. | End Product, lb./hr. |
|---|---|---|---|---|---|---|---|---|
| Monochlorobenzene |  |  |  | 12,603 |  |  | 12,603 | 12,603 |
| Dichlorobenzene |  |  |  | 254 |  |  | 254 | 254 |
| Benzene | 50,696 | 353,369 | 404,065 | 395,062 | 309,931 | 691,736 | 13,257 |  |
| HCl | 4,335 |  | 4,335 | 106 |  |  | 106 |  |
| Water | 21,101 | 31,274 | 52,375 | 54,512 | 29,787 | 61,218 | 23,081 |  |
| N₂ | 8,957 | 13,896 | 22,853 | 22,853 |  | 22,853 |  |  |
| O₂ | 2,722 | 771 | 3,493 | 1,271 |  | 1,271 |  |  |
| CO₂ |  | 690 | 690 | 1,137 |  | 1,137 |  |  |
| Others |  |  |  | 13 |  |  | 13 |  |
| Total | 87,811 | 4,000,000 | 487,811 | 487,811 | 339,718 | 778,215 | 49,314 |  |

Although in the examples herein the distillation column is operated at approximately atmospheric pressure, pressures above or below this may also be used without departing from the scope of our invention.

Since various modifications to this process can be made by one of ordinary skill in this art without departing from the scope of the invention, we do not want to be limited hereto except as defined in the appended claims.

We claim:

1. In a continuous process for the production of monochlorobenzene, wherein vapors of benzene, hydrogen chloride and an oxygen-containing gas are passed through a catalytic reaction zone, the reacted mixture is withdrawn therefrom and introduced with substantially no cooling into the bottom portion of a distillation zone wherein benzene and water are being introduced into the top portion thereof, thereby utilizing the available heat content of the said reacted mixture to evaporate a corresponding quantity of a benzene-water mixture having approximately the composition of the benzene-water azeotrope, thereby forming and withdrawing a vaporous mixture comprising water, benzene and inerts at the top portion of the distillation zone, the improvement which comprises: recirculating from about five percent to about seventy-five percent of said vaporous mixture to the said catalytic reaction zone.

2. The process according to claim 1 wherein from about ten percent to about forty percent of the vaporous mixture is recirculated.

3. The process according to claim 1 wherein the recirculated vaporous mixture is passed with the said benzene, hydrogen chloride and an oxygen-containing gas into the catalytic reaction zone.

4. The process according to claim 1 wherein the recirculated vaporous mixture is split into a number of streams with one stream re-injected into the system with the said benzene, hydrogen chloride, and an oxygen-containing gas into the catalytic reaction zone.

References Cited

UNITED STATES PATENTS

| 1,963,761 | 6/1934 | Prahl | 260—650 X |
| 2,126,988 | 8/1938 | Engelstein | 208—81 |
| 2,166,829 | 7/1939 | Swartwood | 208—81 |
| 2,827,502 | 3/1958 | Loeser et al. | 260—650 |

BERNARD HELFIN, *Acting Primary Examiner.*

LEON ZITVER, *Examiner.*

H. T. MARS, N. J. KING, *Assistant Examiners.*